United States Patent [19]

Nishio et al.

[11] Patent Number: 5,021,213
[45] Date of Patent: Jun. 4, 1991

[54] METHOD OF CASTING POWDER

[75] Inventors: Hiroaki Nishio; Akira Kato; Michitaka Sato; Keiji Watanabe, all of Tokyo, Japan

[73] Assignee: NKK Corporation, Tokyo, Japan

[21] Appl. No.: 540,555

[22] Filed: Jun. 20, 1990

[30] Foreign Application Priority Data

Jun. 22, 1989 [JP] Japan ............................. 1-158338
Jul. 10, 1989 [JP] Japan ............................. 1-175733

[51] Int. Cl.⁵ ......................................... B22F 1/00
[52] U.S. Cl. ................................. 419/36; 419/37; 419/40; 419/54; 419/55; 264/64; 264/125
[58] Field of Search .............. 419/36, 37, 40, 54, 419/55; 264/64, 125

[56] References Cited

U.S. PATENT DOCUMENTS

| | | | |
|---|---|---|---|
| 2,894,837 | 7/1959 | Onstott et al. | 75/201 |
| 3,929,476 | 12/1975 | Kirby et al. | 75/214 |
| 4,041,123 | 8/1977 | Lange et al. | 264/332 |
| 4,883,621 | 11/1989 | Natori et al. | 419/40 |

FOREIGN PATENT DOCUMENTS

| | | |
|---|---|---|
| 0191409 | 5/1986 | European Pat. Off. |
| 0305759 | 8/1989 | European Pat. Off. |
| 1533035 | 4/1971 | Fed. Rep. of Germany |
| 2504424 | 10/1982 | France |
| 2504425 | 10/1982 | France |

OTHER PUBLICATIONS

Patent Abstracts of Japan, vol. 7, No. 254 (M-255), Nov. 11, 1983; and JP-A-58 136 702 (Ishikawa-Jima Harima Jukogyo) 13-08-1983.
Communication with European Search Report dated Aug. 30, 1990.

Primary Examiner—Stephen J. Lechert, Jr.
Attorney, Agent, or Firm—Sughrue, Mion, Zinn, Macpeak & Seas

[57] ABSTRACT

In the method of invention, the formability is imparted to the slurry of a metal or ceramic powder by employing a porous mold and removing the dispersion medium through the evaporation or thermal decomposition thereof, or by using a silazane oil as the dispersion medium and curing it by heating. Since the phase change usually accompanying volume change does not occur in the dispersion medium, strain and deformation rarely occur in the molded body. As result, the sintered body obtained has high dimensional accuracy.

13 Claims, 5 Drawing Sheets

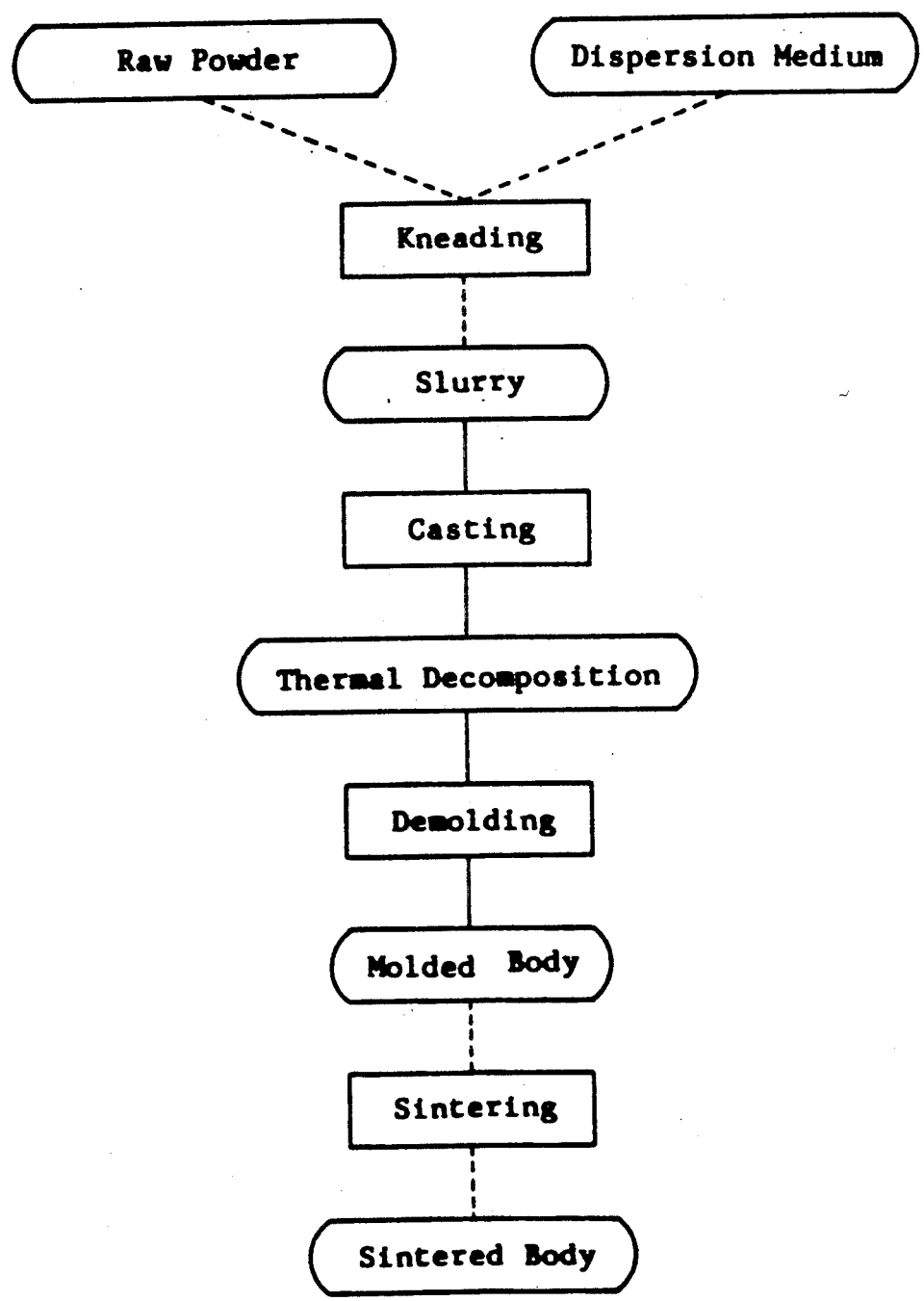
F I G. 1

METHOD OF CASTING POWDER

BACKGROUND OF THE INVENTION

1. Field of the Invention

This invention relates to a method of casting a metal or ceramic powder which comprises suspending the powder into a liquid dispersion medium to form a slurry and casting the slurry into a mold.

2. Description of the Prior Art

A casting method is known as a molding method for metal powder, ceramic powder, and a mixture of metal powder and ceramic powder.

The inventors disclosed in Japanese Patent KOKAI No. 62-192502 a molding method for metal powder or ceramic powder which comprises suspending the powder in a dispersion medium of which the principal component is a material having a melting point of 0° to 100° C. being extractable with liquid or supercritical carbon dioxide, and casting the slurry into a mold which does not absorb liquid. In this method, the cast slurry is cooled to freeze it, and then demolded. Subsequently, the principal component of the dispersion medium in the frozen body is extracted with liquid or supercritical carbon dioxide. The extracted body is heated, and the residual dispersion medium is removed by thermal decomposition. The molded body thus obtained is densified by sintering to obtain a sintered body. An outline of the above process is shown in FIG. 8. The sintered body is machined if necessary, and used for a cutting tool, a machine part or the like.

The above casting method of metal or ceramic powder is excellent in obtaining a molded body in a short time without the generation of cracks, but has the following problems. In the above method, a volume change of the slurry occurs during freezing. For example, when paraffin wax is used as the dispersion medium, a volumetric shrinkage of about 25% occurs. The freezing begins at the portion touching the mold, and strain is generated on the inside of the treated body by the freezing of the outside. Therefore, the frozen body is more or less deformed. By the deformation, the molded body is sometimes broken during demolding. The degree of the deformation sharply varies according to the temperature of the slurry, casting pressure, the temperature of the mold cooling dispersion medium and pressing time, and therefore, suitable casting conditions must be set requiring trial and error experiments for a long time. The internal strain which occurred in the molding process is released during the extraction with a supercritical fluid or a liquefied gas, thermal decomposition or sintering, and deformation proceeds to decrease size accuracy. In the case of a large profile body, the above problems are more remarkable.

SUMMARY OF THE INVENTION

An object of the invention is to provide a method for casting a metal or ceramic powder which is excellent in molding in a short time wherein internal strain and deformation occur little and sintered body having a high dimensional accuracy can be obtained.

Another object of the invention is to provide a method for casting a metal or ceramic powder which does not require trial and error experiments for setting the casting conditions.

Still another object of the invention is to provide a method for casting a metal or ceramic powder which facilitates demolding of the molded body.

The present inventors have investigated in order to achieve the above objects, and completed the present invention by employing a porous mold and removing the dispersion medium through the evaporation or thermal decomposition thereof, or by using a silazane oil as the dispersion medium and curing it by heating.

Thus, the present invention provides a method of casting a metal or ceramic powder which comprises casting a slurry of the metal or ceramic powder suspended in a dispersion medium into a porous mold and heating the slurry placed in the porous mold to remove the dispersion medium through the evaporation or the decomposition of the medium. The present invention also provides a method of casting a metal or ceramic powder suspended in a dispersion medium containing at least 30 wt. % of a silazane oil into a mold, curing the dispersion medium by heating at a temperature of 100° to 200° C., and then demolding.

BRIEF DESCRIPTION OF THE DRAWINGS

FIGS. 1 and 2 are flow diagram illustrating the method of the invention.

DETAILED DESCRIPTION OF THE INVENTION

Figure 2:
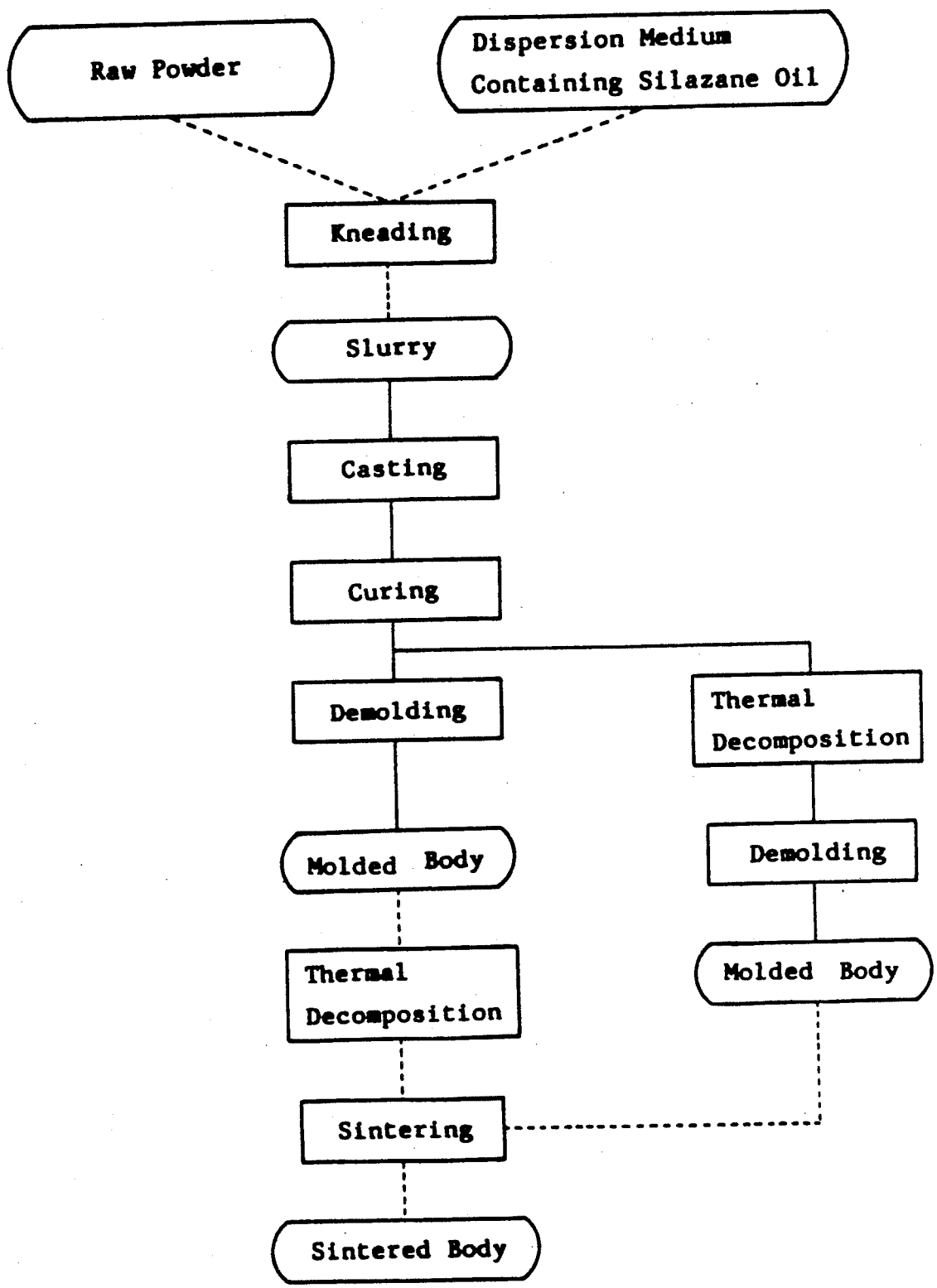

The powder molded by the method of the invention is a metal powder such as 2% Ni-98% Fe mixed powder, SUS 316 powder or high speed steel powder, a ceramic powder such as alumina powder, zirconia powder, silicon nitride powder or silicon carbide powder or a mixed powder of metal and ceramic such as tungsten carbide-cobalt mixed powder or titanium carbide-nickel mixed powder. A suitable particle size of the powder is about 0.2 to 100 μm.

When the dispersion medium is removed by evaporation or thermal decomposition the dispersion medium for suspending the metal or ceramic powder imparts fluidity thereto, but function as a binder for molding is not necessary, different from the conventional method. In the method of the invention, the fluidity of the cast slurry is lost by heating to remove the dispersion medium, and the formability is generated to obtain a molded body. There are many liquids being in conformity with the above object, such as alcohols including methanol, ethanol, propanol and butanol, ketones including acetone, hydrocarbons including hexane and benzene, and liquid paraffin. Preferred liquids can be made in a high vacuum state in view of removing the air (using suction) which is introduced into the slurry of the metal or ceramic powder by stirring during preparing it. In this regard, liquid paraffin is preferable. The dispersion medium may be composed of such a liquid alone.

In the case of curing the dispersion medium by heating, the dispersion medium contains a silazane oil. The silazane oil is a reaction product of a material represented by $R_xSiCl_{4-x}$ ($x=1.2$, $R=H$, $CH_3$, $C_2H_5$, $C_6H_5$), such as $H_2SiCl_2$, $H_3SiCl$, $(CH_3)_2SiCl_2$ or $CH_3SiHCl_2$, with $NH_3$, and has a structure of $[H_2SiNH]_m=[(H_2Si)_{1.5}N]_n$, $[CH_3(CH_3NH)Si(CH_3N)]_p$, $[CH_3Si(CH_3N)_{1.5}]_q$, $(CH_3SiHNH)_r(CH_3SiHNCH_3)_s(CH_3SiN)_t$ or the like. It can be obtained in the liquid state at ordinary temperature by selecting the reaction conditions. The content of the silazane oil is not less than 30 wt. % for curing the dispersion medium. Otherwise, it does not cure at all, or becomes only a gel, and the formability is insufficient. The dispersion medium may be composed of silazane oil alone, or another dispersion medium may be mixed therewith for controlling the properties such as viscosity and dispersibility of the powder. As such other dispersion medium, there are many suitable materials, such as alcohols including methanol, ethanol, propanol and butanol, ketones including acetone, hydrocarbons including hexane and benzene, and liquid paraffin.

When a suitable fluidity is not obtained in either dispersion medium, the fluidity of the dispersion medium may be controlled by adding a dispersing agent such as oleic acid and/or a thickener such as polyvinyl alcohol, polyvinyl butyral, methyl cellulose, carboxymethyl cellulose, ethyl cellulose, paraffin wax or phenol resin.

The concentration of the slurry of the metal or ceramic powder is preferably higher so as to be in the range capable of securing the fluidity necessary for casting, and a suitable concentration 45 to 85 vol. %. When the concentration is less than 45 vol. %, densification in the sintering process is difficult. When the concentration is beyond 85 vol. %, to obtain the fluidity necessary for casting is difficult, even though various means are used such as changing the particle size distribution of the powder and the blending of a dispersing agent. A suitable fluidity of the slurry is in the viscosity range of 50 to $10^4$ poise In the case of removing the dispersion medium by evaporation or thermal decomposition, the mold used is a porous mold. The porous mold must have a strength resistant to the pressure at the time of casting the slurry and gas permeability to permeate the gas produced during heating to remove the dispersion medium to the outside. Suitable materials for the mold include gypsum, a ceramic powder blended with an organic binder, porous sintered ceramics of alumina and the like, porous sintered metals of stainless steel and the like, and foamed organic materials such as foamed polystyrene and foamed polyurethane. Examples o the ceramic powder include a ceramic powder such as silica sand, alumina or the same ceramic powder as employed for the slurry, and examples of the organic binder include ethyl silicate hydrolyzate, polyvinyl alcohol, polyvinyl butyral, methyl cellulose, carboxymethyl cellulose, ethyl cellulose, paraffin wax, phenol resin and epoxy resin.

Figure 3:
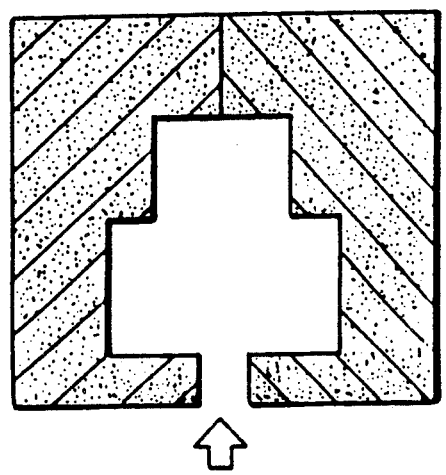
FIG. 3 is a sectional view of a mold used for the method of the invention.
Figure 4:
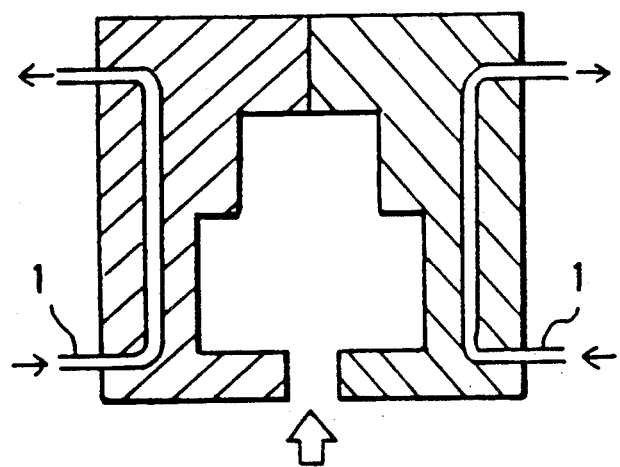
FIG. 4 is a sectional view of a mold used for a conventional method.
Figure 5:
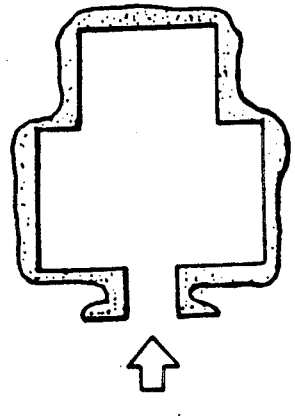
FIG. 5 is a sectional view of another mold used for the method of the invention.

An example of the porous mold for the method of the invention is shown in FIG. 3. This mold is a split mold, and it can be used repeatedly. On the other hand, a conventional mold having the same cavity is shown in FIG. 4. A cooling pipe 1 is provided on the inside of the conventional mold, and the mold is composed of a material having a high heat conductivity, such as aluminum, for efficient cooling. Therefore, the conventional mold is necessarily composed of an expensive material and has a complex structure. Another example of the porous mold for the method of the invention belonging to shell molds is shown in FIG. 5. This mold is produced by making a pattern of wax, a resin such as urea resin, having a shape corresponding to the cavity of the mold, coating the surface of the pattern with a mixture of a ceramic powder and an organic binder in a prescribed thickness, and removing the pattern by steam treatment, thermal decomposition, washing with water or the like. The shell mold is a throwaway type, and has the advantage of permitting complex shaped molding. The organic binder of the shell mold may be a thermally decomposable material. In this case, the shell mold containing the slurry is heated to remove the organic binder together with the dispersion medium in the slurry by thermal decomposition. As a result, the strength of the shell mold decreases, and the subsequent demolding process is facilitated or omitted by self collapse. Suitable organic binders for that purpose include polyvinyl alcohol, polyvinyl butyral, methyl cellulose, carboxymethyl cellulose and ethyl cellulose. A suitable temperature for the thermal decomposition of the binder is 400° to 1200° C.

In the case of curing the dispersion medium by heating, the mold may be porous or non porous. The mold must have a strength resistant to the pressure at the time of casting the slurry, but since the slurry casting pressure is low, i.e. less than 10 kg/cm², preferably 1 to 5 kg/cm², various materials are applicable. Suitable molds include the aforementioned porous molds and non-porous molds made of metal, rubber or the like. Examples of the metal material are aluminum and stainless steel, and examples of the rubber material are urethane rubber and silicone rubber. In the case of a nonporous mold, venting holes may be provided for removing the gas in the mold.

The metal or ceramic powder is kneaded with the dispersion medium, and the slurry is cast into the mold.

In the case of removing the dispersion medium by evaporation or thermal decomposition, the porous mold containing the slurry is placed in a heating apparatus, and heated at a temperature necessary for the evaporation or thermal decomposition of the dispersion medium. During heating, the pressure of the heating apparatus may be reduced. When the dispersion medium is thermally decomposed, a heating temperature of about 400° to 600° C. is usually preferred. After the removal of the dispersion medium, the forming strength of the molded body can be increased by optional calcination up to about 1,000° to 1,300° C. Subsequently, the heat-treated body is taken out from the heating apparatus, and demolded to obtain the molded body. A flow diagram illustrating the method of the invention is shown in FIG. 1. In the case of a throwaway type shell mold, the following process may be employed. That is, in the thermal decomposition process the organic binder of the shell mold is thermally decomposed together with the dispersion medium of the slurry to reduce the strength of the shell mold or to cause the same to collapse by itself. Then, the molded body is obtained through demolding, and sintered to form a dense sintered body.

In the case of curing the dispersion medium by heating, the mold containing the slurry where the dispersion medium contains a silazane oil is placed in a curing oven, and heated at a temperature of 100° to 200° C. to cure the slurry. After the curing, the mold is removed to obtain a molded body. When the molded body is sintered, it is first heated at 400° to 600° C. in a dewaxing oven to thermally decompose the dispersion medium. During heating, the silazane oil is decomposed to produce silicon nitride, silicon carbide or metallic silicon. When the atmosphere or gas contains oxygen gas or water, silica remains, while in a nitrogen gas atmosphere metal silicon may be converted to silicon nitride. In the case of $H_2SiCl_2$ derived silazane oil, silicon nitride remains, and in the case of $(CH_3)SiHCl_2$ derived silazane oil, both of silicon nitride and silicon carbide can be produced. The molded body is sintered in a sintering furnace to form a dense sintered body. The thermal decomposition and the sintering may be conducted continuously in the same furnace. The sintered body is characterized by containing silicon nitride or silicon carbide derived from the silazane oil. A flow diagram illustrating the method of the invention is shown in FIG. 2. As shown in FIG. 2, demolding may be conducted after the thermal decomposition.

In the case of removing the dispersion medium by evaporation or thermal decomposition, the formability is imparted to the slurry by removing the dispersion medium through evaporation or thermal decomposition, instead of utilizing the coagulation of the dispersion medium employed in the conventional method. Though this method requires a longer time compared with the conventional method, since the phase change usually accompanying volume change does not occur in dispersion medium, the strain and deformation rarely occur in the molded body. As a result, the sintered body obtained has highly dimensional accuracy. In the conventional method, trial and error experiments are necessary for determining suitable casting conditions, whereas in the method of the invention the above trial and error experiments are not necessary.

In the case of curing the dispersion medium by heating, the silazane oil is cured by condensation polymerization due to heating at 100° to 200° C., and it is converted from liquid to solid. For example, $H_2SiCl_2$ derived silazane oil is in a liquid state at ordinary temperature, and is cured by heating at 100° C. for 12 hours or at 130° C. for 5 hours. When the temperature is beyond 150° C., a slight loss in weight occurs. When the temperature is beyond 200° C., the loss in weight is appreciably great. In general, in the case of less than 100° C., the curing time is too long, and in the case of higher than 200° C., exhausting of the generated gas is necessary. The dispersion medium is cured by curing the silazane oil to impart the formability to the slurry, and the molded body is obtained. As mentioned previously, when not less than 30 wt. % of silazane oil is blended, the molded body has a strength capable of keeping it's form after demolding. In this method, since little volume change occurs through the curing of silazane oil, strain and deformation rarely occur in the molded body. As a result, the sintered body obtained has a high dimensional accuracy.

EXAMPLES

EXAMPLE 1

Figure 6:
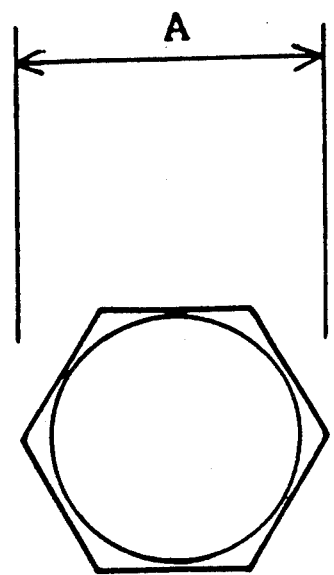
FIG. 6 is a plan view of a molded body.
Figure 7:
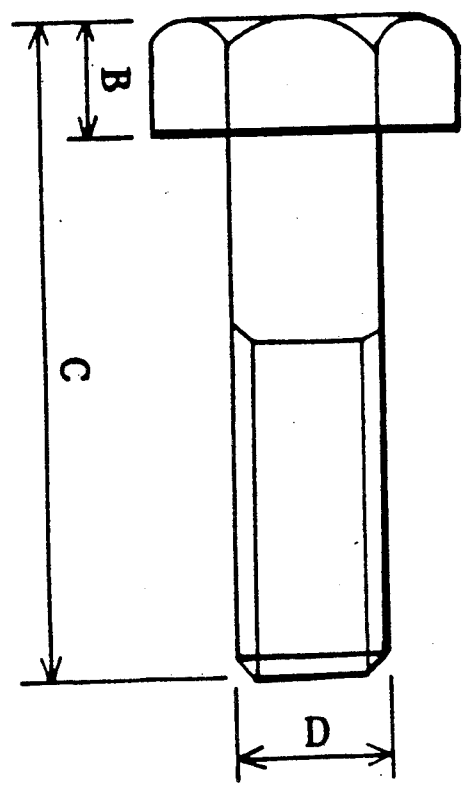
FIG. 7 is a front view thereof.
Figure 8:
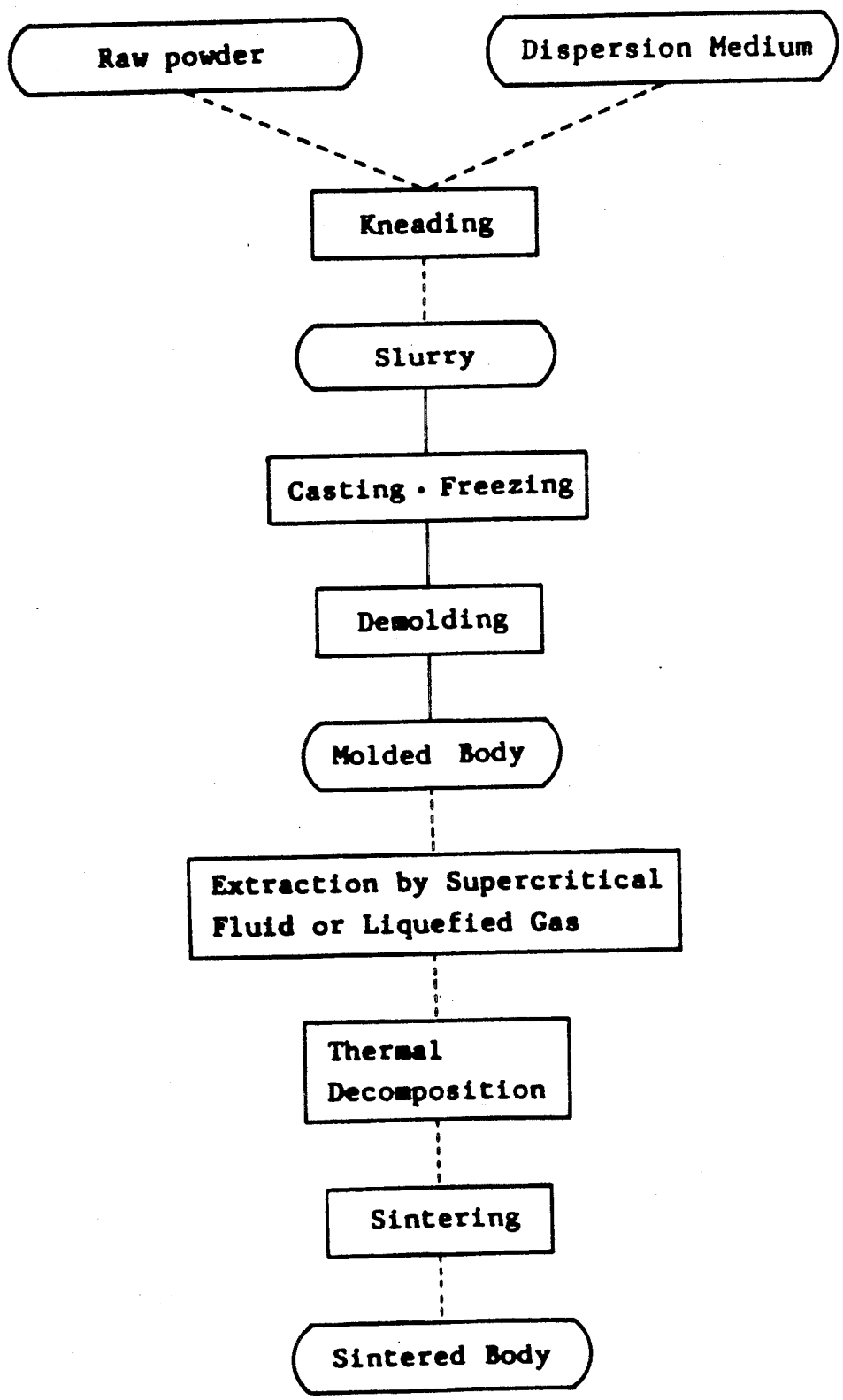
FIG. 8 is a flow diagram illustrating a conventional method.

A silicon nitride bolt was prepared. A raw powder composed of 92.0 parts by weight of $Si_3N_4$ having a mean particle size of 0.75 μm and 6.0 parts by weight of $Y_2O_3$ having a mean particle size of 0.5 μm and 2.0 parts by weight of $Al_2O_3$ having a mean particle size of 1.20 μm as sintering aids were mixed with 27.6 parts by weight of liquid paraffin and 3.0 parts by weight of oleic acid, and kneaded for 24 hours. The obtained slurry was defoamed by exposing it to vacuum. A shell mold having a cavity corresponding to the bolt shown in FIG. 6 and FIG. 7 was formed by using a mixture of 100 parts by weight of the above silicon nitride and 5 parts by weight of polyvinyl butyral as a binder. The above slurry was cast into the shell mold at 22° C. at a casting pressure of 3 kg/cm². The casting pressure was temporarily decreased at the start of casting. After the casting pressure was recovered up to 3 kg/cm², the mold containing the slurry was immediately detached. The mold was placed in a dewaxing furnace, and the temperature was elevated to 500° C. at an elevating speed of 3° C./hr while passing nitrogen gas through the furnace. When the temperature reached 500° C., the temperature was kept there for 2 hours. Then, the mold was naturally cooled. The mold was very fragile, and it was easily removed to obtain a sound molded body. The molded body was buried in a packing powder composed of 50 wt. % of $Si_3N_4$ and 50 wt. % of $SiO_2$, and placed in a sintering furnace. The temperature was elevated to 1200° C. in vacuo, and kept there for 30 minutes. Subsequently, the temperature was further elevated to 1800° C., while nitrogen gas was passed at 9.5 kg/cm², through the furnace and kept for 2 hours. The molded body was cooled to 1000° C. while the gas pressure was kept at 9.5 kg/cm². Then, the pressure was returned to atmospheric pressure, and the molded body was naturally cooled.

Thus, a sintered body having a theoretical density ratio of 98.1% was obtained. Each contraction ratio at the part A, the part B, the part C and the part D of the bolt-shaped sintered body was measured, and the results are shown in Table 1. The dispersion of the contraction ratios was only 0.2%.

TABLE 1

| Part | Mold Size (mm) | Sintered Body of Example 1 | | Sintered Body of Comparative Example 1 | |
|---|---|---|---|---|---|
| | | Size (mm) | Contraction Ratio (%) | Size (mm) | Contraction Ratio (%) |
| A | 31.0 | 25.4 | 18.1 | 25.3 | 18.4 |
| B | 12.2 | 10.0 | 18.0 | 9.9 | 18.9 |
| C | 73.2 | 60.0 | 18.0 | 59.3 | 19.0 |
| D | 16.5 | 13.5 | 18.2 | 13.4 | 18.8 |
| Max-Min | — | — | 0.2 | | 0.6 |

COMPARATIVE EXAMPLE 1

A comparative silicon nitride bolt was prepared by using a bolt mold having the same shape and size as employed in Example 1. 100 parts by weight of the same raw powder as in Example 1 was mixed with 27.6 parts by weight of paraffin having a melting point of 42° C. and 3.0 parts by weight of oleic acid, and kneaded at 90° C. for 24 hours. The obtained slurry was deformed by exposing it to vacuum. The slurry was cast at 90° C. at a casting pressure of 3 kg/cm² into a mold cooled by passing cooling water at 10° C. through pipe 1 in FIG. 4. After the casting pressure was recovered up to 3 kg/cm², the state was kept for 5 minutes for completing the freezing of the slurry, and then the molded body was demolded. Subsequently, the molded body was placed in the extracting apparatus, and extraction was carried out by passing supercritical carbon dioxide at 200 kg/cm² at 60° C. for 4 hours. Thus, a mixture of paraffin and oleic acid corresponding to 62 wt. % of the dispersion medium in the slurry was extracted. Subsequently, the molded body was placed in a pressure dewaxing furnace, and the temperature was elevated at an elevating speed of 100° C./hr under a nitrogen gas atmosphere by passing it through the furnace at a pressure of 6 kg/cm². When the temperature reached 500° C., the temperature was kept there for 1 hour. Then, the mold containing the extracted body was naturally cooled, and the pressure was returned to atmospheric pressure. Thus, the dispersion medium was completely removed. The molded body was sintered under the same conditions as Example 1, and a sintered body having a theoretical density ratio of 98.4% was obtained. Each contraction ratio of the sintered body was measured, and the results are also shown in Table 1. The dispersion of the contraction ratios was 0.6%, and it was inferior to that of Example 1.

EXAMPLE 2

A silicon nitride bolt was prepared. A raw powder composed of 92.0 parts by weight of $Si_3N_4$ having a mean particle size of 0.75 μm and 6.0 parts by weight of $Y_2O_3$ having a mean particle size of 0.5 μm and 2.0 parts by weight of $Al_2O_3$ having a mean particle size of 1.20 μm as sintering aids were mixed with 19.3 parts by weight of liquid paraffin, 3.0 parts by weight of oleic acid and 10.3 parts by weight of $H_2SiCl_2$ derived silazane oil, and kneaded for 24 hours. The obtained slurry was deformed by exposing it to vacuum. A shell mold having a cavity corresponding to the bolt shown in FIG. 6 and FIG. 7 was formed by using a mixture of 100 parts by weight of $Al_2O_3$ powder having a mean particle size of 1.20 μm and 5 parts by weight of polyvinyl butyral as a binder. The above slurry was cast into the shell mold at 22° C. at a casting pressure of 3 kg/cm². The casting pressure was temporarily decreased at the start of casting. After the casting pressure was recovered up to 3 kg/cm², the mold containing the slurry was immediately detached. The mold was placed in a curing oven, and heated at 150° C. for 10 hours under a nitrogen gas atmosphere, and then, naturally cooled. The mold was destroyed to obtain a sound molded body. The molded body was placed in a dewaxing furnace, and the temperature was elevated at an elevating speed of 3° C./hr with passing nitrogen gas through the furnace. When the temperature reached 500° C., the temperature was kept there for 2 hours. Then, the molded body was naturally cooled. The dewaxed molded body was sintered similar to Example 1.

Thus, a sintered body having a theoretical density ratio of 98.6% was obtained. Each contraction ratio at the part A, the part B, the part C and the part D of the bolt-shaped sintered body was measured, and the results are compared with Comparative Example 1 in Table 2. The dispersion of the contraction ratios was only 0.2%.

TABLE 2

| Part | Mold Size (mm) | Sintered Body of Example 1 Size (mm) | Sintered Body of Example 1 Contraction Ratio (%) | Sintered Body of Comparative Example 1 Size (mm) | Sintered Body of Comparative Example 1 Contraction Ratio (%) |
| --- | --- | --- | --- | --- | --- |
| A | 31.0 | 26.0 | 16.1 | 25.3 | 18.4 |
| B | 12.2 | 10.2 | 16.0 | 9.9 | 18.9 |
| C | 73.2 | 61.5 | 16.0 | 59.3 | 19.0 |
| D | 16.5 | 13.8 | 16.2 | 13.4 | 18.8 |
| Max-Min | — | — | 0.2 | — | 0.6 |

We claim:
1. A method of casting a metal or ceramic powder which comprises casting a slurry of 45 to 85 vol. % of the metal or ceramic powder suspended in a dispersion medium into a porous mold having a strength to resist a casting pressure of at least 3 kg/cm² and a capacity to absorb the dispersion medium contained in the cast slurry in the porous mold which is insufficient for the molded body to maintain a molded form without a mold and heating the slurry placed in the porous mold to remove the dispersion medium through the evaporation or the decomposition of the dispersion medium.

2. The method of claim 1 wherein said dispersion medium is liquid paraffin.

3. A method of casting a metal or ceramic powder suspended in a dispersion medium containing at least 30 wt. of a silazane oil into a porous mold, curing the dispersion medium by heating at a temperature of 100° to 200° C., and then demolding.

4. The method of claim 1,2 or 3 wherein said dispersion medium contains a dispersing agent and/or a thickener.

5. The method of claim 1 or 3 wherein said mold is a shell mold containing an organic binder.

6. The method of claim 5 wherein said organic binder is a member selected from polyvinyl alcohol, polyvinyl butyral, methyl cellulose, carboxymethyl cellulose and ethyl cellulose.

7. The method of claim 1 wherein the slurry placed in the porous mold is kept at a temperature capable of decomposing the dispersion medium until the formability of the molded body appears.

8. The method of claim 7 of which the temperature is 400° to 600° C.

9. The method of claim 1 wherein the dispersion medium is a member selected from alcohols, ketones, hydrocarbons and liquid paraffin.

10. A method of casting a metal or ceramic powder into a formed solid product which comprises casting a slurry of 45 to 85 vol. % of the metal or ceramic powder suspended in a dispersion medium into a porous mold having a strength to resist a casting pressure of at least 3 kg/cm² and heating the slurry placed in the porous mold to remove the dispersion medium through the evaporation or the decomposition of the medium, said formed solid product resulting from the heating forcing the evaporated dispersion medium or decomposition production of the dispersion medium through the porous mold to the exterior of the porous mold.

11. The method of claim 10 wherein the slurry placed in the porous mold is kept at a temperature capable of decomposing the dispersion medium until the formability of the molded body appears.

12. The method of claim 11, wherein the temperature is 400° to 600° C.

13. The method of claim 10, wherein the dispersion medium is a member selected from alcohols, ketones, hydrocarbons and liquid paraffin.

* * * * *